3,247,287
PREPARATION OF SOLIDS FROM CARBOXYL CO-
POLYMERS WITHOUT SOLVENT LIBERATION
John E. Masters and Darrell D. Hicks, Louisville, Ky.,
assignors, by mesne assignments, to Celanese Coatings
Company, a corporation of Delaware
No Drawing. Filed Nov. 9, 1962, Ser. No. 236,710
9 Claims. (Cl. 260—837)

This application is a continuation-in-part of our co-pending U.S. patent application Serial No. 788,046, filed January 21, 1959, now abandoned.

This invention pertains to the polymerization of unsaturated acids and related compounds, with vinyl, vinylene or vinylidene compounds to form carboxy copolymers. It is particularly related to processes for the formation of solutions of carboxy copolymers which are capable of being readily cross-linked, and to methods for preparing molded articles or castings from such polymer solutions.

Carboxy copolymers of unsaturated acids or their alcohol esters and different unsaturated monomers are well known. They are prepared by polymerizing with said different monomer an unsaturated carboxylic acid such as acrylic, crotonic, methacrylic, itaconic, maleic, the partial esters or partial salts thereof and anhydrides of the polycarboxylic acids by solution or emulsion polymerization techniques well known to those skilled in the art, the amount of carboxy component in the composition being from 1 to 80 weight percent based on the polymer.

In emulsion polymerization the drying of the coagulum is difficult because of the great tendency of the polymer to coalesce. Subsequent mastication with cross-linking agents is difficult. Accordingly, emulsion polymerized carboxy copolymers are generally used as film-forming materials rather than in pottings, castings, and the like.

Solution polymerization of acid monomers with other unsaturated monomers to form carboxy copolymers does not lend itself to formation of molded articles because of the difficulty of removing the solvent. Even when a low boiling solvent such as acetone is used, it is difficult to form castings free of entrained solvent or of bubbles resulting from solvent liberation. While this invention is not limited thereto, the presence of solvents has prohibited an extensive use of carboxyl containing copolymers in the potting and casting fields. There are, of course, advantages in other fields as well as to not having a volatile solvent to remove.

By the practice of this invention, a process is provided for the preparation of solutions of carboxyl polymers for applications heretofore not practical through the use of polymer solutions. In accordance with this invention, the monomers are polymerized in the presence of a reactive solvent. By "reactive solvent" is meant a non-volatile solvent in which the polymer is soluble and which reacts with the polymer and/or a cross-linking agent for the polymer under curing conditions, that is, at curing temperatures and, if necessary, in the presence of a catalyst. It is understood, however, that under polymerizing conditions, the solvent and the monomers are substantially non-reactive with each other. In other words, the polymerization medium is a solvent which does not react with the monomer or the polymer during polymerization, but which reacts with either the polymer or the cross-linking agent or both when the temperature is raised above the polymerization temperature and a catalyst is used.

Polymer solutions are thus formed which can be mixed with cross-linking agents to form cured materials without the need for solvent liberation. This not only renders the polymer solutions particularly suitable for pottings, castings and encapsulations, but also provides a convenient reaction medium for making high polymers which otherwise would be of little value in pottings, castings, encapsulations etc. because of their extreme viscosities.

Reactive solvents which are employed in accordance with the practice of this invention are saturated carboxylic acids or anhydrides of such acids, alcohols and epoxides, each boiling at 150° C. or above, and each being liquid at the polymerization temperature employed, that is, they have melting points below the polymerization temperature used, generally 60° C. to 150° C. The viscosity of the solvents should not be greater than 130 centipoises at the polymerization temperature.

Of acids, alcohols and epoxides serving as reactive solvents herein, monocarboxylic acids, monohydric alcohols, and monoepoxides are suitable but polycarboxylic acids, polyhydric alcohols, and polyepoxides are preferred. Suitable saturated monocarboxylic acids, including anhydrides, are benzoic acid, propionic acid or anhydride, butyric acid or anhydride, capric acid, caproic acid, myristic acid, and palmitic acid.

Among the preferred polycarboxylic compounds are dicarboxylic acids and anhydrides and particularly mixtures of such anhydrides or acids which form liquid eutectics. Examples of polycarboxylic acids or their anhydrides are phthalic anhydride, succinic anhydride, glutaric acid, sebacic acid, isosuccinic acid, and mixtures of acids such as tetrahydrophthalic and hexachloroendomethylenetetrahydrophthalic acids and hexahydrophthalic anhydride.

Monohydric alcohols which are most advantageously used in accordance with the invention are those which are not readily liberated by heating after the polymer is made. Such alcohols are aliphatic alcohols having boiling points above 150° C. and usually over six carbon atoms. Included are capryl alcohol, stearyl alcohol, lauryl alcohol, 2-ethyl-hexyl alcohol, nonyl alcohol, cyclohexanol, benzyl alcohol, 1-butoxy-2-ethanol, 1-butoxyethoxy-2-propanol, 1-methoxyethoxy-2-ethanol and the like. It is understood that the alcohols as used herein include both the monohydric alcohols and the monohydric ether alcohols. Thus, the commercially available "Cellosolves" and "Carbitols" boiling above 150° C. are used herein. These compositions are the reaction products of monohydric alcohols with ethylene and propylene oxides such as 1-hexoxy-2-ethanol, and ethoxy ethanol. While saturated acids and alcohols are usually employed, it is noted that unsaturated alcohols and acids are usable depending on the reactivity of the double bond under polymerization conditions. Thus, fatty acids of the drying oil type such as soya and linseed oil and stearic acids as well as long chain alcohols can be used.

Of the alcohols, saturated polyhydric alcohols are preferred which boil above 150° C. and which in admixture with the monomers form, at the reaction temperature, liquid solutions having viscosities not exceeding 130 centipoises. Particularly suitable are the high molecular weight glycols. However, glycerin, sorbitol, trimethylol propane and the like can also be used. Suitable glycols are, for instance, ethylene glycol, propylene glycol, diethylene glycol, 1,5-pentanediol, tripropylene glycol, dipropylene glycol, tetraethylene glycol, triethylene glycol, xylylene glycol, dihydroxyethyl ethers of bisphenol, etc. It is understood that the term glycols as used herein also includes both the dihydric alcohols and the dihydric ether alcohols. Thus, the commercially available "Carbowaxes" are contemplated. These are mixtures of polyoxyethylene glycols. Those mixtures having average molecular weights of from 200 to 1000 are particularly desirable. The polyoxypropylene glycols are also contemplated.

The third class of reactive solvents is saturated monoand poly-epoxides, especially mono- and poly-glycidyl ethers and esters of alcohols and acids. Examples of mono-epoxide solvents are such monoepoxides as styrene oxide, glycidol, phenyl glycidyl ether, glycidyl acetate, glycidyl benzoate, butyl glycidyl ether, and the like.

Among the polyepoxides which can be used as reactive solvents are glycidyl polyethers of polyhydric alcohols and polyhydric phenols prepared by reacting the alcohol or phenol with a halohydrin such as epichlorhydrin in the presence of an alkali. These are well-known ethoxyline resins and are described in such patents as U.S. 2,467,171, U.S. 2,538,072, U.S. 2,582,985, U.S. 2,615,007, U.S. 2,698,315, U.S. 2,581,464. In addition to glycidyl ethers, epoxy esters are included. Desirable epoxy esters can be made by the epoxidation of unsaturated esters by reaction with a peracid such as a peracetic acid or performic acid, a desirable ester thus prepared being 3,4-epoxy-6-methyl cyclohexylmethyl-3,4 - epoxy - 6 - methylcyclohexanecarboxylate,

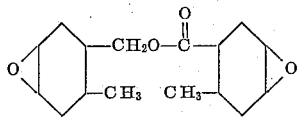

Other epoxides are also included, for example, epoxidized drying oils, acids and esters. It is noted that the reactive solvent need not be a liquid at room temperature. It is necessary only that it have a viscosity of not more than 130 centipoises at the polymerization temperature. It is a low melting compound which will be liquid at the polymerization temperature. The reactive solvents set forth hereinbefore make excellent reaction media. In some cases upon cooling, crystalline slids result which can be readily liquified on heating. If desired, the solid polymer-diluent compositions can be pulverized for convenience in use.

Methods of polymerizing the alpha-beta unsaturated acids with various comonomers are well known. Polymerization is effected by conventional solution polymerization techniques, except that the polymerization medium contemplated herein is used as a solvent rather than one of the conventional volatile media. The amount of polymerization medium employed will depend upon several things; the viscosity of the medium, the molecular weight of the polymer made, and the solubility of the polymer in the medium. Thus, when a low molecular weight monocarboxylic acid, monohydric alcohol, or monoepoxide is employed, less will be required when a more viscous composition, such as a diepoxide or a higher molecular weight alcohol, is used. In addition, if a low molecular weight polymer is made, not as much medium is required as when a higher molecular weight polymer is prepared. This being the case, it can best be stated that sufficient polymerization medium is used to form, at the reaction temperature, a solution of the resulting carboxy copolymer in the polymerization medium. Generally, the amount of polymerization medium will be 30 to 40 percent with 70 to 60 percent by weight carboxy copolymer. From 5 to 80 parts acid, preferably 10 to 50, are reacted with 95 to 20 parts comonomer, the polymerization reaction being carried out at temperatures of from 60° C. to the reflux temperature, generally 60° C. to 150° C., if desired, at a pressure slightly above atmospheric. The polymerization reaction is, of course, accelerated by the use of heat and other conditions such a peroxide cataylst, e.g. benzoyl peroxide, cumene hydroperoxide, tertiarybutylhydroperoxide, phthalic peroxide, acetyl peroxide, lauroyl peroxide, ditertiarybutylperoxide, etc.

The carboxyl-containing copolymers prepared according to the present invention are formed by reacting the vinyl, vinylidene or vinylene monomer with an alpha-beta ethylenically monounsaturated acid. Contemplated are acrylic, methacrylic, or crotonic, itaconic, citraconic, maleic and fumaric acid, their anhydrides or partial esters, or mixtures thereof. Preferred acids are alpha-beta ethylenically monounsaturated monocarboxylic acids of not more than four carbon atoms. Desirable partial esters are half esters of fumaric acid, maleic acid or maleic anhydride, the alcohols having not more than 20 carbon atoms, for example, monobutyl maleate, monooctyl fumarate and monocetyl maleate. Preferred acid esters are those formed with alcohols having from 1 to 10 carbon atoms.

Polymerized with the alpha-beta unsaturated acid is a monoethylenically unsaturated monomer. By a monoethylenically unsaturated monomer is intended an organic compound containing a single —CH=CH— group, or more especially a $CH_2=C<$ group. Included are vinyl, vinylene, and vinylidene monomers copolymerizable with the alpha-beta unsaturated acid. Particularly important are vinylidene and vinyl aromatic compounds, for instance, styrene, vinyl toluene, alpha-methyl styrene, the halo-styrenes, etc. having a single vinyl group and free of other substituents capable of reacting with an unsaturated acid, in other words, a monounsaturated vinyl aromatic compound. Other suitable monomers are isopropenyl toluene, the various dialkyl styrenes, ortho-, meta-, and para-chloro styrenes, bromo styrenes, fluoro styrenes, cyano styrenes, vinyl naphthalene, the various alpha-substituted styrenes, e.g., alpha-methyl styrenes, alpha-methyl para-methyl styrenes, as well as various di-, tri-, and tetrachloro, bromo, and fluoro styrenes. Also valuable are acrylic, methacrylic, and crotonic esters of saturated alcohols, such as methyl, ethyl, propyl, isopropyl, n-butyl, isobutyl, (sec)butyl, amyl, hexyl, heptyl, octyl, decyl, dodecyl, etc. esters of acrylic, methacrylic and crotonic acids, generally alpha-beta unsaturated monocarboxylic acid esters of saturated monohydric alcohols, the acids having not more than four carbon atoms and the alcohols having not more than twenty carbon atoms.

As indicated hereinbefore, the preparation of carboxyl-containing copolymers is known. Accordingly, it is unnecessary to set forth all monomers known in the art. For example, other monomers so used are vinyl aliphatic cyanides of not more than four carbon atoms, such as acrylonitrile and methacrylonitrile, as well as monovinyl ethers, e.g., ethyl vinyl ether, ethyl methallyl ether, vinyl butyl ether, methyl vinyl ether and others of not over twenty carbon atoms. Included also are unsaturated monohydric alcohol esters of saturated monobasic acids wherein the alcohols contain a single vinyl group and the acids have not more than twenty carbon atoms, for instance, vinyl acetate, vinyl stearate, and the allyl, methallyl and crotyl esters of propionic, butyric and other acids. Not only the unsaturated monomers themselves, but mixtures of the monomers can be copolymerized with the alpha-beta unsaturated acids to form the carboxyl-containing copolymer. A desirable mixture is a combination of an acrylic or methacrylic ester with styrene or vinyl toluene. Of course, when mixtures are employed a certain degree of selectivity must be exercised. Thus, it is preferred not to use vinyl acetate or similar esters with styrene and the like. Likewise, there will be certain preferred combinations of monomers and unsaturated acids forming the copolymers. For instance, it is undesirable to use vinyl aromatics, e.g., styrene, with maleic or fumaric or their half esters, because of the tendency of such half esters to polymerize in constant proportions with other monomers. In addition, it is desirable not to use maleic acid with a vinyl acetate monomer.

It is understood that while many monomers can be used in the preparation of the copolymer and that while a wide variety of reactive solvents can be used, all these combinations cannot necessarily be used with equivalent results. There are necessarily certain preferences and some combinations of monomers and solvents which will give better results than certain other combinations. Thus where the polymer is a copolymer of styrene or vinyl toluene and acrylic or methacrylic acid, hexahydrophthalic acid anhydride is a preferred reactive solvent rather than phthalic anhydride which is not as suitable. On the other hand if a hydroxy compound such as a monohydric alcohol or a glycol is used as the reactive solvent, acrylonitrile desirably should not be used as a monomer in preparation of the carboxy copolymer. In the case of vinyl aromatic monomers, it has been found also that vinyl toluene is more compatible in the systems contemplated herein than styrene. In addition if the carboxy copolymer is made from crotonic acid and vinyl acetate, it is preferred to start the polymerization without the reactive solvent and to add the solvent during a later stage of polymerization. With respect to the reactive solvent, it has also been found that decreasing the amount of reactive solvent leads to the formation of longer chain polymers having higher tensile strengths.

In forming cross-linked compositions from the carboxy-copolymer solutions of this invention, if the diluent is a polyepoxide, the composition can be cross-linked by heat alone or with the addition of a small amount of catalyst, otherwise any of the known polyfunctional cross-linking compositions which react with the copolymer or the reactive solvent as the case may be, such as anhydrides, alcohols, epoxides, isocyanates and the like, can be used depending, of course, on the solvent system. However, in our preferred embodiment, cross-linking agents are used such that an epoxy-carboxy system, or preferably a carboxy-epoxy-acid anhydride system results. Thus, if a carboxylic acid anhydride is used as the reactive solvent, a polyepoxide such as a glycidyl polyether of a dihydric phenol is preferred as the cross-linking agent. If the reactive solvent is an epoxide, a dibasic acid anhydride or polybasic acid anhydride is used as the cross-linking agent. In the case of glycols, monoepoxides or monocarboxylic acids as reactive solvents, a polyepoxide and an anhydride are preferably both used to form the cross-linking system. If the copolymer has a high carboxyl content, the use of an anhydride is not essential. But in many cases, it will be desirable.

In making moldings, castings and the like by the teachings of this invention, the carboxy copolymer and the reactive solvent can be further reacted with each other, as where a polyepoxide is employed as the reactive solvent, or with a third compound such as polyisocyanate, zinc oxide, a caustic alkali, a primary or secondary amine or a polyamine In such a system, the carboxy-containing copolymer and the polyepoxide are preferably used in a ratio of one carboxyl equivalent of copolymer to one to two epoxide equivalents of polyepoxide and 0.01 to 5 percent of a catalyst such as an amine or potassium hydroxide, BF$_3$, etc., based on the total composition. The copolymer will have been made using one equivalent epoxide solvent for each carboxyl equivalent ethylenically unsaturated acid. However, it is desirable to have a carboxy-epoxy-polycarboxylic acid anhydride system, and preferably a carboxy-epoxy-alcohol-polycarboxylic acid anhydride system. Thus if the carboxy copolymer is made in the presence of an acid anhydride, it is preferred to employ a polyepoxide in the formation of the solid objects. In many instances, it will be even more desirable to use a polyepoxide and a polyhydric alcohol. If the carboxy copolymer is made with a polyepoxide as the reactive solvent, a polycarboxylic acid anhydride makes a desirable cross-linking agent. A combination of the acid anhydride and a polyhydric alcohol also makes a desirable cross-linking system.

In the formation of a carboxy-epoxy-polycarboxylic acid anhydride system, the reactants are employed in ratios resulting in a cross-linked thermoset composition, usually from 1 to 2 equivalents anhydride to 2 equivalents polyepoxide to 0.2 to 0.8 equivalent copolymer. And either the anhydride or the polyepoxide as the case may be, can be used as the reactive solvent with the other being subsequently added as a cross-linking agent. Moreover, all of the required anhydride or polyepoxide need not be used as reactive solvent as any additionally required can be added with the cross-linking agent. However, as a rule, all of the required anhydride or epoxide is used as the reactive solvent. It is understood that the carboxy equivalent of the copolymer depends upon the amount of acid used in its preparation, and the ratios of polycarboxylic acid anhydride and polyepoxide depend upon this carboxy equivalency of the copolymer as set forth in the aforementioned ratio.

Since a preferred system is a carboxy copolymer-polycarboxylic acid anhydride-polyepoxide-polyhydric alcohol system, if the copolymer becomes too viscous when either the anhydride, or the polyepoxide alone is used, the composition can be further thinned with an alcohol or the copolymer can be made in the presence of an anhydride or epoxide-alcohol mixture. It is preferred to start the copolymer reaction in the alcohol medium and then add anhydride or epoxide if necessary to control the viscosity. In such a system, 1 equivalent polyepoxide is employed for each carboxy equivalent copolymer and the anhydride, polyepoxide, and polyhydric alcohol are employed in amounts of 2 equivalents anhydride to 2 equivalents epoxide to 0.4 to 1.6 equivalent alcohol. The total ratio when a polyhydric alcohol is used is, therefore, 1 equivalent carboxy copolymer to 3 polyepoxide equivalents, to 2 anhydride equivalents to 0.4 to 1.6 equivalent polyhydric alcohol.

If a polycarboxylic acid is employed as the solvent, and a polyepoxide as the cross-linking agent, the ratio will be 2 equivalents polyepoxide to 1 carboxyl equivalent copolymer to 1 carboxyl equivalent acid. In an anhydride, copolymer, epoxide, carboxylic acid system, the ratio of reactants is 1 equivalent copolymer to 3 equivalents epoxide, to 2—$y$ equivalents anhydride, to $y$ equivalents carboxylic acid where $y=0.1$ to 0.8. Since the epoxide equivalent includes both monoepoxides and polyepoxides, it should be pointed out that polyepoxide must be used if a cross-linked final composition is to be obtained. A monoepoxide can be employed as the reactive solvent and polyepoxide used later as at least part of the cross-linking agent. At least fifteen percent of the total epoxide should be polyepoxide.

By an epoxide, anhydride, hydroxyl or carboxyl equivalent is meant the gram equivalent weight based on the particular group, in other words, the weight in grams per epoxide, anhydride, hydroxyl or carboxyl group.

It is understood that in the carboxy-epoxy curing system, a catalyst can be employed if desired. Generally speaking, any of the known catalysts which are activators for epoxy-carboxy reactions can be used to increase the rate of cross-linking, for example, inorganic and organic bases, e.g. amines, quaternary ammonium hydroxides and alkali metal or alkaline earth metal hydroxides, examples are sodium hydroxide, calcium hydroxide, dimethylamino phenol, benzyl dimethylamine and the like. Particularly desirable catalysts are quaternary ammonium salts such as benzyl trimethylammonium acetate and benzyl trimethylammonium chloride, etc. These activators are employed in catalytic quantities, say from 0.01 percent to 5 percent based on the total compositions. Curing conditions will, of course, vary with the particular application. In general, the carboxy-epoxy composition with or without the anhydride and alcohol is heated at 170° C. to 200° C., generally 180° C. to form a cross-linked infusible resin if no catalyst is used. If a catalyst is employed, the copolymer-solvent composition is cured at a temperature of from 125° C. to 200° C., the period depending upon the size of the casting, varying from one to four hours with a catalyst and three to twelve hours when no catalyst is used.

In order more fully to illustrate the invention, the following examples are included. The examples are for the purpose of illustration only, and it is intended that no undue limitation be read into the invention by referring to the examples, the tables, or the discussion thereof. The epoxides employed were made by the well-known method described hereinbefore. The following table gives the ratio of epichlorhydrin to polyhydric compound used to prepare the resins. The polyhydric compound reacted with the epichlorhydrin and the epoxide equivalent of the epoxy compound is also given.

| Mol Ratio | | Hydroxy Compound | Epoxide Equivalent |
|---|---|---|---|
| Epichlor-hydrin | Hydroxy Compound | | |
| 10 | 1 | Bisphenol | 190 |
| 2 | 1 | Polyethylene Glycol (m.w. 200) | 200 |
| 2 | 1 | Trimethylolpropane | 177 |
| 3 | 1 | Glycerol | 155 |

The epoxides will be identified in the examples by their epoxide equivalent. Thus, when the epoxide used in the examples is a glycidyl polyether having a weight per epoxide of 190 obtained from the reaction of 10 mols of epichlorhydrin to one mol of bisphenol, this epoxide is referred to as Epoxide 190 in the examples and table. Likewise, the epoxide obtained from the reaction of 2 mols of epichlorhydrin to one mol of polyethylene glycol (molecular weight 200) is referred to as Epoxide 200.

EXAMPLE 1

A. Copolymer preparation

| Material | Units | Weight (grams) |
|---|---|---|
| Vinyl Toluene | 60.0 | 120.0 |
| Methyl Acrylate | 20.0 | 40.0 |
| Methacrylic Acid | 20.0 | 40.0 |
| Benzoyl Peroxide | 2.0 | 4.0 |
| Epoxide 190 | | 100.0 |
| Polyethylene Glycol (Molecular Weight 300) | | 100.0 |

In a one liter, three-necked, round-bottomed flask fitted with an agitator, thermometer, condenser and dropping funnel, the Epoxide 190 and polyethylene glycol are heated to 125° C. In an Erlenmeyer flask, the vinyl toluene, methyl acrylate, methacrylic acid and catalyst are heated with agitation until complete solution results. This monomer-catalyst solution is then introduced into the flask containing the preheated epoxide-glycol diluent by means of the dropping funnel. During the addition of this monomer-catalyst solution, a period of one and one-half hours, the temperature of the flask contents are held below 125° C. After the addition is complete, the flask contents are held at 125° C. until reflux ceases, whereupon the flask is fitted for vacuum distillation and any excess monomer is distilled off at 15 mm. Hg and 117° C. The resulting product is a 50 percent solution of a 60/20/20 vinyl toluene/methyl acrylate/methacrylic acid polymer in a 50/50 mixture, by weight, of Epoxide 190 and a polyethylene glycol having a molecular weight of 300. The copolymer portion of the composition has a theoretical carboxyl equivalent of 430 while the total copolymer solution has a theoretical carboxyl equivalent of 860, epoxide equivalent of 760 and hydroxyl equivalent of 600.

B. Cured composition

In a suitable container, 94.4 grams of the copolymer solution of this example (0.108 carboxyl equivalent of copolymer, 0.124 epoxide equivalent of Epoxide 190 and 0.156 hydroxyl equivalent of polyethylene glycol) are combined with 57.2 grams (0.300 epoxide equivalent) of Epoxide 190 and 48.4 grams (0.628 anhydride equivalent) of hexahydrophthalic anhydride. The mixture is heated with stirring at 50° C. to 70° C. until a clear solution results. To the solution is added with stirring, 0.25 gram of dimethylaminomethyl phenol. The resulting blend is cast between glass plates and is baked at 150° C. for thirty minutes in a circulating oven followed by a two and one-half hour bake at 180° C. The casting obtained has the following physical properties:

| | |
|---|---|
| Tensile strength _____lb./sq. in__ | 9,300 |
| Flexural strength _____lb./sq. in__ | 15,600 |
| Elongation _____percent__ | 4.5 |
| Impact strength _____ft. lb./in. notch__ | 0.43 |
| Hardness (Rockwell M) _____ | 88 |
| Water absorption _____percent__ | 0.3 |

EXAMPLE 2

A. Copolymer preparation

| Material | Units | Weight (grams) |
|---|---|---|
| Methyl Alcohol | 8.0 | 24.0 |
| Maleic Anhydride | 24.5 | 73.5 |
| Methyl Acrylate | 67.5 | 202.5 |
| Benzoyl Peroxide | 2.0 | 6.0 |
| Polyethylene Glycol (Molecular Weight 300) | | 200.0 |

To prepare monomethyl maleate, in one liter, three-necked, round-bottom flask, the methyl alcohol and maleic anhydride are heated at 125° C. for one hour. The flask contents are cooled to room temperature and the methyl acrylate and benzoyl peroxide are combined with the monomethyl maleate to make a monomer-catalyst mixture. These proportions represent (based on the total weight of the reactants) 32.5 weight percent of monomethyl maleate and 67.5 weight percent of methyl acrylate. In another one liter, three-necked, round-bottomed flask fitted with an agitator, thermometer, condenser and dropping funnel, the polyethylene glycol is heated to 125° C. at which time the addition of the monomer-catalyst solution is started by means of the dropping funnel at a fast drop rate. During the addition, two hours and twenty minutes, the reaction temperature is maintained below the reflux temperature. When the addition is complete, the reaction is held at 130° C. to 135° C. for an additional hour after which it is cooled to room temperature. The flask is fitted for vacuum distillation and any excess monomer is distilled off at 15 mm. Hg and 120° C., in this case only a few drops. The flask contents are cooled and the 60 percent carboxy copolymer solution in polyethylene glycol is poured into a suitable container. The copolymer portion of the composition has a theoretical carboxy equivalent of 400, while the total copolymer solution has a carboxyl equivalent of 667 and a hydroxyl equivalent of 240.

B. Cured composition

In a suitable container, 64.0 grams of the copolymer solution of this example (0.096 carboxyl equivalent of copolymer and 0.172 hydroxyl equivalent of the glycol) are combined with 52.8 grams (0.684 anhydride equivalent) of hexahydrophthalic anhydride and 83.2 grams (0.436 epoxide equivalent) of Epoxide 190. The mixture is heated with stirring at 80° C. to 100° C. until solution occurs. To the solution is added with stirring 0.25 gram dimethylaminomethyl phenol. The mixture is cast between glass plates, and is heated at 100° C. for one hour followed by a bake of two hours at 150° C. The resulting clear casting has these physical properties:

| | |
|---|---|
| Tensile strength _____lbs./sq. in__ | 2000 |
| Elongation _____percent__ | 150 |
| Impact strength _____ft. lb./in. notch__ | 0.55 |
| Hardness (Shore D) _____ | 66 |
| Water absorption _____percent__ | 0.6 |

Another casting is prepared and cured as above from 64.8 grams of the copolymer solution of this example (0.096 carboxyl equivalent of the copolymer and 0.172 hydroxyl equivalent of the glycol) combined with 84.0 grams (0.440 epoxide equivalent) of Epoxide 190, 51.2 grams (0.692 anhydride equivalent) of phthalic anhydride and 0.25 gram of dimethylaminomethyl phenol. The casting has these physical properties:

Tensile strength _____lbs./sq. in.___ 4500
Elongation _____percent___ 110
Impact strength _____ft. lb./in. notch___ 0.48
Hardness (Shore D) _____ 76
Water absorption _____percent___ 0.6

EXAMPLE 3

A. Copolymer preparation

| Material | Units | Weight (grams) |
| --- | --- | --- |
| Vinyl Acetate | 80.0 | 120.0 |
| Crotonic Acid | 20.0 | 30.0 |
| Benzoyl Peroxide | 3.0 | 4.5 |
| Polyethylene Glycol (Molecular Weight 300) | | 75.3 |
| Hexahydrophthalic Anhydride | | 154.7 |

In a 500 ml. round-bottomed, three-necked flask equipped with an agitator, thermometer, reflux condenser and dropping funnel, the vinyl acetate, crotonic acid and benzoyl peroxide are heated to reflux (78° C. to 80° C.). These proportions represent (based on the total weight of the two reactants) 80.0 weight percent of vinyl acetate and 20.0 weight percent of crotonic acid. In an Erlenmeyer flask, the hexahydrophthalic anhydride is dissolved by heating in polyethylene glycol (molecular weight=300)

The monomer-catalyst mixture is held at reflux until the solution becomes highly viscous (about three and one-half hours) at which time the diluent mixture is added to the flask contents through the dropping funnel at a moderate dropwise rate over a period of about one hour. As the amount of diluent present increases, the reflux temperature increases, however, the reaction temperature is not allowed to exceed 135° C. and when all of the diluent is added, the reaction mixture is maintained at this temperature until reflux ceases. The 39.5 percent carboxy copolymer solution in a 32.8 percent/67.2 percent mixture of glycol and anhydride is allowed to cool to room temperature. The copolymer portion of the composition has a carboxyl equivalent of 430 grams while the total copolymer solution has a carboxyl equivalent of 1088, a hydroxyl equivalent of 756 and an anhydride equivalent of 189.

B. Cured composition

With stirring 130.0 grams (0.112 carboxyl equivalent of copolymer, 0.156 hydroxyl equivalent of glycol and 0.632 anhydride equivalent of anhydride) of the copolymer solution of this example and 80.0 grams (0.420 epoxide equivalent) of Epoxide 190 are heated at 80° C. to 100° C. until homogeneous solution results. Into the mixture is blended, with stirring, 0.25 gram of dimethylaminomethyl phenol. The mixture is cast between glass plates and is baked at 100° C. for one hour followed by a two hour bake at 150° C. The resulting clear casting exhibits the following physical properties:

Tensile strength _____lb./sq. in.___ 2500
Elongation _____percent___ 90
Impact strength _____ft. lb./in. notch___ 0.45
Hardness (Rockwell M) _____ 30
Water absorption _____percent___ 0.6

EXAMPLE 4

A. Copolymer preparation

| Material | Units | Weight (grams) |
| --- | --- | --- |
| Vinyl Toluene | 60.0 | 120.0 |
| Methyl Acrylate | 20.0 | 40.0 |
| Methacrylic Acid | 20.0 | 40.0 |
| Benzoyl Peroxide | 2.0 | 4.0 |
| Dimerized Soya Fatty Acids [1] | | 200.0 |

[1] Dimerized soya fatty acid is a commercial form of a dimeric polymer consisting essentially of dilinoleic acid. The method used in its preparation is set forth in the Journal of American Oil Chemists' Society, March 1957, pp. 9–65.

Into a one liter, round-bottomed, three-necked flask fitted with a thermometer, agitator, dropping funnel and reflux condenser are charged the dimerized soya fatty acids. While in a separate container, a monomer-catalyst solution is prepared by combining the vinyl toluene, methyl acrylate, methacrylic acid and benzoyl peroxide. These proportions of monomers in the monomer-catalyst solution represent (based on the total weight of the three reactants) 60 weight percent of vinyl toluene, 20 weight percent of methyl acrylate, and 20 weight percent of methacrylic acid. The dimerized soya fatty acids are heated to 125° C. with agitation after which the monomer-catalyst solution is slowly introduced into the flask by means of the dropping funnel over a period of about one and one-half hours. During this addition, the reaction temperature is held under 135° C. After all of the monomer-catalyst solution is added, the reaction mixture is heated at slow reflux to a temperature of 155° C. over a period of an hour after which heating is discontinued and the resulting 50 percent carboxy copolymer solution is poured into a suitable container. The copolymer portion of the composition has a theoretical weight per carboxyl group of 430 while the diluent has a weight per carboxyl group of 306. The total copolymer solution has a carboxyl equivalent of 357.

B. Cured composition

In a suitable container, 79.6 grams of the 50 percent copolymer solution of this example (0.092 carboxyl equivalent of copolymer and 0.128 carboxyl equivalent of diluent) are combined with 80.0 grams (0.420 epoxide equivalent) of Epoxide 190 and 40.8 grams (0.528 anhydride equivalent) of hexahydrophthalic anhydride and are heated to 50° C. to 80° C. with agitation until solution occurs. Into this solution is blended with stirring 0.25 gram of dimethylaminomethyl phenol. The mixture is cast between glass plates and is heated in a circulating oven at 150° C. for thirty minutes followed by a 180° C. bake for two hours. The clear casting obtained has these physical properties:

Tensile strength _____lb./sq. in.___ 6900
Flexural strength _____lb./sq. in.___ 11000
Elongation _____percent___ 6.6
Impact strength _____ft. lb./in. notch___ 0.26
Hardness (Rockwell M) _____ 81
Water absorption _____percent___ 0.1

EXAMPLE 5

A. Copolymer preparation

| Material | Units | Weight (grams) |
| --- | --- | --- |
| Vinyl Toluene | 60.0 | 120.0 |
| Methyl Acrylate | 20.0 | 40.0 |
| Methacrylic Acid | 20.0 | 40.0 |
| Benzoyl Peroxide | 2.0 | 4.0 |
| Epoxide 200 | | 200.0 |

In accordance with Example 1, the Epoxide 200 is heated to 125° C. The monomer-catalyst solution made up of vinyl toluene, methyl acrylate, methacrylic acid and catalyst is then added to the preheated epoxide diluent. During the addition of the monomer-catalyst solution, a period of one and one-half hours, the temperature of the flask contents are held below 125° C. After the addition is complete, the flask contents are held at 125° C. until reflux ceases, producing a 50 percent solution of a 60/20/20 vinyl toluene/methyl acrylate/methacrylic acid polymer in Epoxide 200. The copolymer portion of the composition has a theoretical carboxyl equivalent of 430 while the total copolymer solution has a theoretical carboxyl equivalent of 860.

The resulting product is a viscous solution which on further heating forms a tough, flexible, insoluble, infusible product.

EXAMPLE 6

A. Copolymer preparation

| Material | Units | Weight (grams) |
|---|---|---|
| Vinyl Toluene | 60.0 | 120.0 |
| Methyl Acrylate | 20.0 | 40.0 |
| Methacrylic Acid | 20.0 | 40.0 |
| Benzoyl Peroxide | 2.0 | 4.0 |
| Hexahydrophthalic Anhydride | | 200.0 |

A monomer-catalyst solution is prepared by combining the vinyl toluene, methyl acrylate, methacrylic acid, and benzoyl peroxide in a flask. The hexahydrophthalic anhydride is then heated in a one liter flask to 125° C. and the monomer-catalyst mixture is added to the contents of the flask through a dropping funnel at a fast dropwise rate over a period of about one hour. After all of the monomer-catalyst solution is added, the reaction mixture is heated at slow reflux to a temperature of 150° C. forming a 50 percent carboxy copolymer solution. The copolymer portion of the composition has a theoretical carboxyl equivalent of 430 while the total copolymer solution has a theoretical carboxy equivalent of 860 and anhydride equivalent of 154.

B. Cured composition

As outlined in Part B of Example 1, 96 grams of the copolymer solution (.223 carboxyl equivalent of copolymer and .624 anhydride equivalent of hexahydrophthalic anhydride) are combined with 80.8 grams (.425 epoxide equivalent) of Epoxide 190 and 23.6 grams (.157 hydroxyl equivalent) of polyethylene glycol. The mixture is heated with stirring at 80° C. to 110° C. To the solution is added with stirring .25 gram of dimethylaminomethyl phenol. The resulting blend is cast and baked as described in Example 1, producing a hard, infusible, insoluble product.

EXAMPLE 7

A. Copolymer preparation

| Material | Units | Weight (grams) |
|---|---|---|
| Vinyl Toluene | 60.0 | 120.0 |
| Methyl Acrylate | 20.0 | 40.0 |
| Methacrylic Acid | 20.0 | 40.0 |
| Benzoyl Peroxide | 2.0 | 4.0 |
| Tetrahydrophthalic Anhydride | | 100.0 |
| Hexachloroendomethylenetetrahydrophthalic (HET) Anhydride | | 100.0 |

In the manner described in Example 3, the tetrahydrophthalic anhydride and the HET anhydride are heated together in a one liter flask to 120° C. At this temperature, the monomer-catalyst solution, having been prepared by combining the vinyl toluene, methyl acrylate, methacrylic acid and benzoyl peroxide, is added to the anhydride solution through a dropping funnel at a fast dropwise rate over a period of about one and one-half hours. When all of the monomer-catalyst solution has been added, the temperature of the reaction mixture is increased to 150° C. and maintained there for a period of 45 minutes. The resulting product is a 50 percent solution of a 60/20/20 vinyl toluene/methyl acrylate/methacrylic acid polymer in a 70/30 tetrahydrophthalic/HET anhydride mixture. The copolymer portion of the composition has a carboxyl equivalent of 430 while the total copolymer solution has a carboxyl equivalent of 860 and an anhydride equivalent of 251.

B. Cured composition

As described in Part B of Example 1, 108.8 grams (.251 carboxyl equivalent of copolymer and .433 anhydride equivalent of tetrahydrophthalic and HET anhydrides) of the copolymer solution, 72.8 grams (.384 epoxide equivalent) of Epoxide 190, and 19.2 grams (.128 hydroxyl equivalent) of polyethylene glycol are heated with stirring at 80° C. to 100° C. until the mixture has melted. Into the mixture is added, with stirring, 25 grams of dimethylaminomethyl phenol. The mixture is cured as in Part B of Example 1, producing a very hard casting having very good toughness and flexibility properties.

EXAMPLE 8

A. Copolymer preparation

| Material | Units | Weight (grams) |
|---|---|---|
| Styrene | 60.0 | 120.0 |
| Methacrylic Acid | 40.0 | 80.0 |
| Benzoyl Peroxide | 2.0 | 4.0 |
| Polypropylene Glycol (Molecular Weight 1,200) | | 200.0 |

In the manner described in Example 1, the polypropylene glycol is heated to 125° C. in a one liter flask. At this temperature, the monomer-catalyst solution, prepared by mixing together the styrene, methacrylic acid, and benzoyl peroxide, is added to the preheated glycol diluent by means of a dropping funnel at a fast dropwise rate, over a period of about one hour. After the addition is complete, the flask contents are held at 135° C. until reflux ceases, forming a viscous, 50 percent solution of a 60/40 styrene/methacrylic acid copolymer in polypropylene glycol. The copolymer portion of the composition, which appears clear, has a theoretical carboxyl equivalent of 215 while the total copolymer solution has a theoretical carboxyl equivalent of 430 and hydroxyl equivalent of 1198.

B. Cured composition

In accordance with Part B of Example 2, 99.6 grams (.464 carboxyl equivalent of copolymer and .835 hydroxyl equivalent of polypropylene glycol) of the copolymer solution, 75.6 grams (.398 epoxide equivalent) of Epoxide 190, and 25.2 grams (.327 anhydride equivalent) of hexahydrophthalic anhydride are heated with stirring at 80° C. to 100° C. Into the mixture is added, with stirring, .25 gram dimethylaminomethyl phenol. In the manner described in Part B of Example 2, the mixture is cured by heating at 100° C. for one hour followed by a 150° C. bake for two hours, producing a casting which is very hard and quite tough and flexible.

EXAMPLE 9

A. Copolymer preparation

| Material | Units | Weight (grams) |
|---|---|---|
| Vinyl Toluene | 60.0 | 120.0 |
| Methacrylic Acid | 40.0 | 80.0 |
| Benzoyl Peroxide | 2.0 | 4.0 |
| Polypropylene Glycol (Molecular Weight 750) | | 200.0 |

Following the procedure of Example 1, the polypropylene glycol is heated in a one liter flask to 125° C. The monomer-catalyst solution, prepared by mixing together the vinyl toluene, methacrylic acid, and catalyst, is then introduced into the flask containing the preheated glycol diluent at a fast dropwise rate. After the addition of the monomer-catalyst solution, a period of about one-half hour, the flask contents are held at 135° C. until reflux ceases. The resulting product is a 50 percent solution of a 60/40 vinyl toluene/methacrylic acid copolymer in polypropylene glycol. The copolymer portion of the composition has a theoretical carboxyl equivalent of 215 while the total copolymer solution has a theoretical equivalent of 430 and hydroxyl equivalent of 750.

B. Cured composition

As described in Part B of Example 2, 84.4 grams (.392 carboxyl equivalent of copolymer and .112 hydroxyl equivalent of polypropylene glycol) of the copolymer solution, 80.0 grams (.420 epoxide equivalent) of Epoxide 190, and 35.6 grams (.508 anhydride equivalent) of hexahydrophthalic anhydride are heated at 80° C. to 100° C. with stirring. To this mixture is added .25 gram of dimethylaminomethyl phenol. The mixture is cured as in Part B of Example 2, producing a very hard casting having good toughness and flexibility properties.

EXAMPLE 10

A. Copolymer preparation

| Material | Units | Weight (grams) |
|---|---|---|
| Vinyl Acetate | 80.0 | 120.0 |
| Crotonic Acid | 20.0 | 30.0 |
| Benzoyl Peroxide | 3.0 | 4.5 |
| Polypropylene Glycol (Molecular Weight 1,200) | | 150.0 |

In accordance with the preceding examples, the vinyl acetate, crotonic acid, and benzoyl peroxide are heated to reflux (75° C. to 77° C.) in a 500 milliliter flask. When the viscosity of the flask contents reaches the point where more agitation is needed, the polypropylene glycol is added by means of a dropping funnel at a moderate dropwise rate. After the addition is complete, the reaction mixture is held at reflux (135° C.) for twenty minutes. The resulting product is a 50 percent solution of a 80/20 vinyl acetate/crotonic acid copolymer in polypropylene glycol. The copolymer portion of the composition has a theoretical carboxyl equivalent of 430 while the total copolymer solution has a theoretical carboxyl equivalent of 862 and hydroxyl equivalent of 1200.

B. Cured composition

Following the procedure of Part B of Example 1, 111.6 grams (.260 carboxyl equivalent of copolymer and .930 hydroxyl equivalent of polypropylene glycol) of the copolymer solution, 60 grams (.316 epoxide equivalent) of Epoxide 190, and 28.8 grams (.374 anhydride equivalent) of hexahydrophthalic anhydride are heated at 80° C. to 100° C. To this solution is added .25 gram of dimethylaminomethyl phenol. The resulting blend is cured as described in Part B of Example 1, producing a tough, flexible casting.

EXAMPLE 11

A. Copolymer preparation

| Material | Units | Weight (grams) |
|---|---|---|
| Vinyl Acetate | 80.0 | 240.0 |
| Crotonic Acid | 20.0 | 60.0 |
| Benzoyl Peroxide | 4.0 | 12.0 |
| Polypropylene Glycol (Molecular Weight 750) | | 300.0 |

According to the preceding examples, the vinyl acetate, crotonic acid, and benzoyl peroxide are heated in a one liter flask to reflux (78° C. to 80° C.). To this monomer-catalyst solution is added 300 grams of polypropylene glycol in 50 gram increments, the frequency of the additions depending on the viscosity of the solution. After the addition is complete, the flask contents are held at reflux until the reflux temperature reaches 125° C. to 130° C. The resulting product is a 50 percent solution of a 80/20 vinyl acetate-crotonic acid copolymer in polypropylene glycol. The copolymer portion of the composition has a theoretical carboxyl equivalent of 430 while the total copolymer solution has a theoretical carboxyl equivalent of 860 and hydroxyl equivalent of 750.

B. Cured composition

Following Part B of Example 2, 84.4 grams (.196 carboxyl equivalent of copolymer and .112 hydroxyl equivalent of polypropylene glycol) of the copolymer solution, 72.4 grams (.381 epoxide equivalent) of Epoxide 190, and 43.6 grams (.565 anhydride equivalent) of hexahydrophthalic anhydride are heated together at 80° C. to 100° C. To this solution is added .12 gram of dimethylaminomethyl phenol. The resulting blend is cured as described in Part B of Example 2, producing a casting having excellent hardness, toughness, and flexibility properties.

EXAMPLE 12

A. Copolymer preparation

| Material | Units | Weight (grams) |
|---|---|---|
| Vinyl Acetate | 80.0 | 80.0 |
| Crotonic Acid | 20.0 | 20.0 |
| Benzoyl Peroxide | 4.0 | 4.0 |
| Epoxide 177 | | 100.0 |

In accordance with Example 3, the vinyl acetate, crotonic acid, and benzoyl peroxide are heated in a 500 milliliter flask to reflux (78° C. to 80° C.). The monomer-catalyst mixture is held at reflux until the solution becomes highly viscous (about one and one-half hours) at which time 50 grams of the diluent, diglycidyl ether of trimethylol propane, are added to the flask contents. After approximately thirty minutes, another 50 grams of the diluent are added to the flask contents. The reaction mixture is held at reflux until the reflux temperature reaches 90° C. The resulting product is a 50 percent solution of an 80/20 vinyl acetate/crotonic acid copolymer in Epoxide 177. The copolymer portion of the composition has a carboxyl equivalent of 430 while the total copolymer solution has a carboxyl equivalent of 862 and epoxide equivalent of 354.

B. Cured composition

Following the procedure of Part B of Example 1, 200 grams (.465 carboxyl equivalent of the copolymer and .565 epoxide equivalent of the Epoxide 177) of the copolymer solution is heated at 80° C. to 100° C. To this solution is added .10 gram of dimethylaminomethyl phenol with stirring. As described in Part B of Example 1, the resulting solution is cured by baking for one-half hour at 100° C. followed by a bake of one hour at 150° C., producing a hard, tough, flexible casting.

EXAMPLE 13

A. Copolymer preparation

| Material | Units | Weight (grams) |
|---|---|---|
| Vinyl Acetate | 80.0 | 80.0 |
| Crotonic Acid | 20.0 | 20.0 |
| Benzoyl Peroxide | 4.0 | 4.0 |
| Epoxide 155 | | 100.0 |

In accordance with the preceding examples, the vinyl acetate, crotonic acid, and benzoyl peroxide are heated together in a 500 milliliter flask to reflux (78° C. to 80° C.). After this monomer-catalyst solution has refluxed for approximately one and one-half hours, the Epoxide 155 is added to the solution. Reflux of the reaction mixture is continued until the temperature reaches 90° C. to 95° C. The resulting product is a 50 percent solution of a 80/20 vinyl acetate/crotonic acid copolymer in Epoxide 155. The copolymer portion of the composition has a theoretical carboxyl equivalent of 430 while the total copolymer solution has a carboxyl equivalent of 862 and an epoxide equivalent of 300.

B. Cured composition

In the manner described in Part B of Example 1, 200 grams (.465 carboxyl equivalent of copolymer and .666 epoxide equivalent of Epoxide 155) of the copolymer solution is heated at 80° C. to 100° C. To this solution is added .1 gram of dimethylaminomethyl phenol with stirring. As described in Part B of Example 12, the resulting mixture is cured to produce an infusible insoluble resin which is very flexible and quite soft.

The following table illustrates other compositions of the invention. In the table, the copolymer is identified as "60/20/20 VT/MA/MAA." This is a terpolymer of 60 parts by weight vinyl toluene, 20 parts by weight methyl acrylate, and 20 parts methacrylic acid. Other designations are explained in the footnotes to the table. In the equivalent ratio portion of the table, the column headed "Reactive Diluent" includes only diluents such as acids or alcohols which are not in one of the other ratio columns. If part or all of the diluent is an epoxide or an anhydride, that portion is included in the anhydride or epoxide column. PEG 300, 600, etc. as used in the table, represents a mixture of polyethylene glycols having an average molecular weight of 300, 600, etc., as the case may be. All of the products whose properties are set forth in the following table were cured for one hour at 100° C. and then post-cured for two hours at 150° C. using one percent dimethylaminomethyl phenol as a catalyst.

TABLE I

| No. | Copolymer | Copolymer Concentration Percent | Copolymer Carboxyl Equivalent | Reactive Diluent | Copolymer-Diluent Appearance | Equivalent Ratios | | | |
|---|---|---|---|---|---|---|---|---|---|
| | | | | | | Copolymer | Diluent | Anhydride [1] | Epoxide |
| 1 | 60/20/20 VT/MA/MAA | 50 | 430 | PEG 300 | Slight haze, non-flow | 1.0 | 2.87 | 5.48 | 7.75 |
| 2 | 60/20/20 VT/MA/MAA | 50 | 430 | PEG 600 | Clear, non-flow | 1.0 | 1.43 | 2.88 | 3.88 |
| 3 | 60/20/20 VT/MA/MAA | 50 | 430 | 50% Epox. 190, 50% PEG 300 | do | 1.0 | 1.42 | 2.86 | 3.86 |
| 4 | 60/20/20 VT/MA/MAA | 50 | 430 | 50% 2-ET Hexanol, 50% PEG 300 | Clear, flows | 1.0 | 3.09 | 12.4 | 13.4 |
| 5 | 60/20/20 VT/MA/MAA | 50 | 430 | D-4 | Slight haze, non-flow | 1.0 | 2.21 | 17.75 | 18.8 |
| 6 | 60/20/20 VT/MA/MAA | 50 | 430 | Dimer Acids | Clear, non-flow | 1.0 | 1.405 | 2.84 | 4.51 |
| 7 | 60/20/20 VT/MA/MAA | 33⅓ | 430 | 50% Dimer Acids, 50% HHPA | Clear, flows | 1.0 | 1.408 | 2.80 | 4.53 |
| 8 | 60/20/20 VT/MA/MAA | 40 | 430 | 50% Dimer Acids, 50% HHPA | Incompatible, non-flow | 1.0 | 1.408 | 2.80 | 4.53 |
| 9 | 60/20/20 VT/MA/MAA | 50 | 430 | 31% CoCo Fatty Acids, 69% HHPA | do | 1.0 | 1.43 | 2.87 | 3.88 |
| 10 | 60/20/20 STY/MA/MAA | 33⅓ | 430 | 50% Dimer Acids, 50% HHPA | Incompatible, flows | 1.0 | 1.07 | 2.90 | 3.78 |
| 11 | 60/20/20 STY/MA/MAA | 50 | 430 | PEG 600 | Slight haze, non-flow | 1.0 | .638 | 1.056 | 2.55 |
| 12 | 80/20 STY/MA | 33⅓ | 430 | 50% Dimer Acids, 50% HHPA | Hazy, flows | 1.0 | 1.408 | 2.80 | 4.53 |
| 13 | 80/20 MA/MAA | 50 | 430 | PEG 600 | Clear, flows | 1.0 | 1.43 | 2.87 | 3.88 |
| 14 | 60/40 MA/MAA | 50 | 215 | PEG 600 | Clear, non-flows | 1.0 | .72 | 1.44 | 2.43 |
| 15 | 60/40 VT/MAA | 33⅓ | 215 | 50% Dimer Acids, 50% HHPA | Incompatible, non-flow | 1.0 | .704 | 1.395 | 2.76 |
| 16 | 84/16 MA/MMM | 66⅔ | 800 | PEG 300 | Clear, flows | 1.0 | 3.56 | 7.15 | 8.10 |
| 17 | 84/16 MA/MMM | 66⅔ | 800 | PEG 300 | do | 1.0 | 3.56 | [2] 7.10 | 8.07 |
| 18 | 84/16 MA/MMM | 66⅔ | 800 | 33% PEG 300, 67% HHPA | Clear, non-flow | 1.0 | 1.178 | 3.95 | 4.95 |
| 19 | 84/16 MA/MMM | 66⅔ | 800 | 33% PEG 300, 67% HHPA | do | 1.0 | 1.16 | 5.82 | 6.79 |
| 20 | 68/32 MA/MMM | 60 | 400 | PEG 300 | Clear, flows | 1.0 | 1.77 | 3.04 | 4.02 |
| 21 | 68/32 MA/MMM | 60 | 400 | PEG 300 | do | 1.0 | 1.78 | [2] 3.01 | 4.65 |
| 22 | 57/43 MA/MBM | 60 | 400 | 33% PEG 300, 67% HHPA | do | 1.0 | .605 | 2.94 | 3.92 |
| 23 | 57/43 MA/MBM | 60 | 400 | 33% PEG 300, 67% HHPA | do | 1.0 | .583 | 1.938 | 2.93 |
| 24 | 28.5/28.5/43 MA/MM/MBM | 60 | 400 | 33% PEG 300, 67% HHPA | do | 1.0 | .605 | 2.94 | 3.92 |
| 25 | 78/22 MA/MBM | 42.9 | 800 | 16% PEG 300, 84% HHPA | do | 1.0 | 1.16 | 5.82 | 6.79 |
| 26 | 78/22 MA/MBM | 60 | 800 | 33% PEG 300, 67% HHPA | Incompat., slight flow | 1.0 | 1.178 | 3.95 | 4.95 |
| 27 | 78/22 MA/MBM | 60 | 800 | 33% PEG 300, 67% HHPA | do | 1.0 | 1.16 | 5.82 | 6.79 |
| 28 | 34/23/43 MM/MA/MBM | 50 | 400 | 33% PEG 300, 67% HHPA | Clear, slight flow | 1.0 | .875 | 4.38 | 5.36 |
| 29 | 40/17/43 MM/MA/MBM | 50 | 400 | 33% PEG 300, 67% HHPA | Clear, flows | 1.0 | .875 | 4.38 | 5.36 |
| 30 | 71/29 MA/MEHM | 60 | 800 | 33% PEG 300, 67% HHPA | do | 1.0 | 1.178 | 3.95 | 4.95 |
| 31 | 71/29 MA/MEHM | 60 | 800 | 33% PEG 300, 67% HHPA | do | 1.0 | 1.16 | 5.82 | 6.79 |
| 32 | 43/57 MA/MEHM | 60 | 400 | 33% PEG 300, 67% HHPA | do | 1.0 | .595 | 2.95 | 7.57 |
| 33 | 42/20/38 MA/VT/MEHM | 50 | 600 | 33% PEG 300, 67% HHPA | Clear, slight flow | 1.0 | 1.32 | 6.56 | 7.56 |
| 34 | 31/31/38 MA/VT/MEHM | 50 | 600 | 33% PEG 300, 67% HHPA | Clear, non-flow | 1.0 | 1.33 | 3.29 | 4.28 |
| 35 | 31/31/38 MA/VT/MEHM | 50 | 600 | 33% PEG 300, 67% HHPA | do | 1.0 | 1.32 | 6.56 | 7.56 |
| 36 | 31/31/38 MM/VT/MEHM | 50 | 600 | 33% PEG 300, 67% HHPA | do | 1.0 | 1.32 | 6.56 | 7.56 |
| 37 | 20/42/38 MA/VT/MEHM | 50 | 600 | 33% PEG 300, 67% HHPA | do | 1.0 | 1.32 | 6.56 | 7.56 |
| 38 | 69/31 MA/MD³³M | 60 | 600 | 33% PEG 300, 67% HHPA | Clear, flows | 1.0 | .83 | 2.90 | 3.92 |
| 39 | 69/31 MA/MD³³M | 60 | 600 | 33% PEG 300, 67% HHPA | do | 1.0 | .875 | 4.38 | 5.40 |
| 40 | 51/49 MA/MD⁴M | 50 | 600 | 33% PEG 300, 67% HHPA | do | 1.0 | 1.32 | 3.26 | 4.26 |
| 41 | 80/20 VAc/CA | 50 | 430 | PEG 300 | do | 1.0 | 2.866 | 5.76 | 6.73 |
| 42 | 80/20 VAc/CA | 66⅔ | 430 | PEG 300 | Clear, non-flow | 1.0 | 1.45 | 2.87 | 3.85 |
| 43 | 80/20 VAc/CA | 39½ | 430 | 33% PEG 300, 67% HHPA | do | 1.0 | 1.45 | 2.86 | 3.81 |
| 44 | 80/20 VAc/CA | 50 | 430 | 33% PEG 300, 67% HHPA | do | 1.0 | .945 | 1.859 | 2.72 |
| 45 | 80/20 VAc/CA | 50 | 430 | PEG 600 | Clear, flows | 1.0 | 1.467 | 2.90 | 3.88 |
| 46 | 80/20 VAc/CA | 50 | 430 | PEG 600 | do | 1.0 | 1.43 | [2] 2.98 | 3.87 |
| 47 | 80/20 VAc/CA | 33⅓ | 430 | 50% PEG 750, 50% HHPA | do | 1.0 | 1.148 | 2.79 | 3.84 |
| 48 | 80/20 VAc/CA | 33⅓ | 430 | 50% PEG 750, 50% HHPA | do | 1.0 | 1.145 | 3.80 | 4.80 |
| 49 | 80/20 VAc/CA | 33⅓ | 430 | 50% PEG 750, 50% HHPA | do | 1.0 | 1.145 | 5.75 | 6.75 |

[1] Hexahydrophthalic Anhydride unless otherwise specified.
[2] Phthalic Anhydride.

VT—Vinyl Toluene.
MA—Methyl Acrylate.
MAA—Methacrylic Acid.
STY—Styrene.
MMM—Monomethyl Maleate.
MBM—Monobutyl Maleate.
MM—Methyl Methacrylate.
MEHM—Mono-2-Ethyl Hexyl Maleate.
MD⁴M—Monoethylene glycol-p-tert-butylphenyl ether maleate.
MD³³M—Monomaleate ester of Propylene Glycol Methylether.
CA—Crotonic Acid.
VAc—Vinyl Acetate.
HHPA—Anhydride of Example 4.
D-4—Ethylene Glycol-p-tert-butylphenyl Ether, Mol. Wt. 194.3.
Dimer Acids—Those acids of Ex. 1.
CoCo Fatty Acids—A mixture of fatty acids, a major portion of which is lauric acid, obtained by double distillation of coconut oil and available commercially.

TABLE I—Continued

| No. | Tensile | | Percent Elongation | Flexure | | Impact (Notched) | Hardness [3] | Percent Water Absorption |
|---|---|---|---|---|---|---|---|---|
| | Ult. | Mod.×10⁶ | | Ult. | Mod.×10⁶ | | | |
| 1 | [4]7,000 | .18 | 9 | 11,000 | .34 | .44 | 78M | .3 |
| 2 | [4]900 | | 160 | | | 7.0 | 55D | 1.3 |
| 3 | 9,300 | .21 | 4.5 | 15,600 | .46 | .43 | 88M | .3 |
| 4 | 9,800 | .24 | 4.1 | 16,100 | .51 | .46 | 95M | .1 |
| 5 | 9,800 | .24 | 3.9 | 20,000 | .55 | .47 | 102M | .09 |
| 6 | 6,900 | .18 | 6.6 | 11,000 | .32 | .26 | 81M | .1 |
| 7 | [4]3,500 | .09 | 42 | 4,900 | .20 | .25 | 55M | .1 |
| 8 | 2,300 | .07 | 56 | | | .26 | 36M | .1 |
| 9 | 3,400 | .06 | 112 | | | 1.8 | 74D | 1.1 |
| 10 | 2,600 | | 50 | 5,200 | .17 | .22 | 80D | .1 |
| 11 | 5,300 | .19 | 2.9 | 10,000 | .41 | .22 | 90M | .1 |
| 12 | 4,600 | .11 | [4]30 | 5,900 | .19 | .27 | 56M | .1 |
| 13 | 900 | | 127 | | | No Break (16# ARM) | 44D | 2.2 |
| 14 | 3,000 | .05 | [4]68 | | | 1.1 | 75D | 1.3 |
| 15 | 6,200 | .13 | [4]10 | 9,300 | .27 | .27 | 89M | .1 |
| 16 | 4,400 | .09 | 60 | 4,600 | .14 | .45 | 80D | .4 |
| 17 | 9,500 | .19 | 11 | 13,000 | .40 | .48 | 83D | .4 |
| 18 | 3,000 | .07 | [4]73 | | | .37 | 78D | .4 |
| 19 | 8,000 | .15 | [4]16 | 12,200 | .35 | .44 | 85M | .2 |
| 20 | 2,000 | .12 | [4]150 | | | [4].55 | 66D | .6 |
| 21 | [4]4,500 | | 110 | | | .48 | 76D | .6 |
| 22 | 4,500 | .10 | 40 | 5,400 | | .29 | 81D | .3 |
| 23 | 1,400 | | 114 | | | [4].55 | 67D | .4 |
| 24 | 7,400 | .15 | 5.6 | 13,000 | .40 | .35 | 79M | .2 |
| 25 | [4]6,200 | .13 | 15 | 9,900 | .28 | .47 | 78M | .2 |
| 26 | [4]2,800 | .04 | 98 | | | [4].48 | 71D | .4 |
| 27 | 6,900 | .14 | [4]17 | 10,000 | .28 | .34 | 84D | .2 |
| 28 | 9,600 | .25 | 5 | 12,000 | .46 | .42 | 89M | .1 |
| 29 | [4]9,300 | .15 | 5 | 14,000 | .47 | [4].37 | 86D | .2 |
| 30 | 1,700 | | [4]120 | | | .24 | 72D | .3 |
| 31 | 4,600 | .09 | [4]24 | 6,500 | | .19 | 60M | .42 |
| 32 | 3,300 | | [4]50 | | | [4].45 | 78D | .2 |
| 33 | 8,900 | .23 | 4.2 | 16,000 | .46 | .37 | 91M | .1 |
| 34 | 2,300 | .05 | 92 | | | [4].43 | 76D | .3 |
| 35 | 8,900 | .23 | 4 | 17,000 | .46 | .40 | 92M | .1 |
| 36 | 9,100 | .23 | 3.8 | 15,000 | .51 | .33 | 95M | .1 |
| 37 | [4]9,600 | .20 | 5 | 17,000 | .49 | [4].42 | 88M | .1 |
| 38 | 2,000 | | [4]115 | | | .49 | 69D | .5 |
| 39 | 5,400 | .11 | [4]25 | 7,900 | .23 | .47 | 71M | .2 |
| 40 | 1,500 | | [4]185 | | | .33 | 66D | .4 |
| 41 | 3,100 | .05 | 125 | 4,000 | .13 | .42 | 79D | .5 |
| 42 | 5,300 | .14 | [4]50 | 11,000 | .35 | .44 | 84D | .5 |
| 43 | 2,500 | .05 | [4]90 | | | [4].45 | 30M | .6 |
| 44 | [4]2,900 | .11 | 41 | | | .40 | 56M | .6 |
| 45 | 500 | | 110 | | | No Break | 38D | 2.5 |
| 46 | 1,300 | | [4]225 | | | No Break | 53D | 2.1 |
| 47 | 500 | .07 | [4]90 | | | 3.0 | 85A | .56 |
| 48 | 1,550 | .12 | [4]90 | | | [4]1.3 | 65D | .40 |
| 49 | 3,900 | .12 | 34 | | | [4].44 | 80D | .22 |

[3] M—Rockwell M Scale; other letters refer to Shore.
[4] Average of several duplicates.

The foregoing examples show that by the practice of this invention, it is not only possible to incorporate the copolymers into casting compositions, but products containing up to 25 to 30 percent copolymer are prepared having physical properties comparable to many epoxy systems. It is understood that properties of castings will vary not only with the monomers and the carboxy equivalent of the copolymer, but with the various cross-linking agents. Hence, a wide variation of operation and products is possible within the spirit of this invention. Such variations and modifications are deemed to be within the scope of this invention.

What is claimed is:

1. A process for the preparation of a cross-linked carboxy copolymer which comprises forming a solution of an uncrosslinked carboxy copolymer devoid of solvent boiling below 150° C. by polymerizing, at a temperature of from 60° C. to about 150° C., a solution comprising
   (A) an α,β-ethylenically unsaturated carboxylic acid containing not more than four carbon atoms,
   (B) a different monoethylenically unsaturated monomer copolymerizable with said (A), and
   (C) as the sole polymerization solvent, a polyhydric alcohol,
   said (C)
   (1) being a solvent for and non-reactive with said (A), said (B) and said uncrosslinked carboxy copolymer under the polymerization conditions used.
   (2) being present in an amount sufficient to dissolve said (A), said (B) and said uncrosslinked carboxy copolymer,
   (3) being saturated or containing unsaturation which is non-reactive under the polymerization conditions used,
   (4) having a melting point below the polymerization temperature,
   (5) having a boiling point of at least 150° C.,
   (6) having a viscosity not exceeding 130 centipoises at the polymerization temperature, and
   (7) being capable of entering the curing reaction when said uncrosslinked carboxy copolymer is cured,
adding a polyepoxide and a polycarboxylic acid anhydride to said uncrosslinked carboxy copolymer solution to form a polycarboxylic acid anhydride: polyhydric alcohol: polyepoxide: uncrosslinked carboxy copolymer system having the ratio of 2 equivalents of said polycarboxylic acid anhydride to 0.4–1.6 equivalent of said polyhydric alcohol to 3 equivalents of said polyepoxide to 1 equivalent of said uncrosslinked carboxy copolymer, and heat-curing the resulting composition.

2. A process as described in claim 1 wherein said uncrosslinked carboxy copolymer solution is prepared by polymerizing
   (A) 20 percent of methacrylic acid,
   (B) a mixture of 60 percent of vinyl toluene and 20 percent of methyl acrylate, and
   (C) a polyethylene glycol having an average molecular weight of about 300,
said polyepoxide is the diglycidyl ether of bisphenol A and said polycarboxylic acid anhydride is hexahydrophthalic anhydride.

3. A process as described in claim 1 wherein said (A) is methacrylic acid and said (B) is methyl acrylate.

4. A process as described in claim 1 wherein said (A) is methacrylic acid and said (B) is vinyl toluene.

5. A process as described in claim 1 wherein said (A) is methacrylic acid and said (B) is a mixture of vinyl toluene and methyl acrylate.

6. A process as described in claim 1 wherein said (C) is an ether alcohol.

7. A process as described in claim 1 wherein said (C) is a polyethylene glycol.

8. A process as described in claim 1 wherein said (C) is glycerol.

9. A process as described in claim 1 wherein said (C) is trimethylolpropane.

References Cited by the Examiner

UNITED STATES PATENTS

| 2,947,717 | 8/1960 | Belanger. |
| 2,957,843 | 10/1960 | Anderson et al. _____ 260—33.2 |
| 2,965,602 | 12/1960 | Hicks. |
| 3,046,246 | 7/1962 | Muskat. |

MORRIS LIEBMAN, *Primary Examiner.*

J. W. BEHRINGER, K. B. CLARKE, A. LIBERMAN, *Assistant Examiners.*